US010264860B1

(12) United States Patent
Rau et al.

(10) Patent No.: US 10,264,860 B1
(45) Date of Patent: Apr. 23, 2019

(54) ATTACHMENT DEVICE FOR QUICK CONNECT OF TREKKING, SHOOTING AND WEIGHT ASSIST EQUIPMENT

(71) Applicant: Jonathon M. Rau, Eau Claire, WI (US)

(72) Inventors: Jonathon M. Rau, Eau Claire, WI (US); Wayne Phillips, Hudson, WI (US)

(73) Assignee: Jonathon M. Rau, Eau Claire, WI (US)

( * ) Notice: Subject to any disclaimer, the term of this patent is extended or adjusted under 35 U.S.C. 154(b) by 0 days.

(21) Appl. No.: 15/976,058

(22) Filed: May 10, 2018

(51) Int. Cl.
G03B 17/00 (2006.01)
A45B 9/02 (2006.01)
F16M 13/08 (2006.01)
F16M 11/24 (2006.01)
F41A 23/14 (2006.01)
F16M 11/04 (2006.01)
F16M 11/06 (2006.01)
A45B 1/04 (2006.01)
F16M 13/04 (2006.01)

(52) U.S. Cl.
CPC ............ A45B 9/02 (2013.01); A45B 1/04 (2013.01); F16M 11/041 (2013.01); F16M 11/06 (2013.01); F16M 11/242 (2013.01); F16M 13/04 (2013.01); F16M 13/08 (2013.01); F41A 23/14 (2013.01)

(58) Field of Classification Search
USPC .......................................................... 396/419
See application file for complete search history.

(56) References Cited

U.S. PATENT DOCUMENTS 3,235,997 A * 2/1966 Stoner .................... F41A 23/08
                                                              42/94
D390,301 S * 2/1998 Peterson .................... D22/108
(Continued)

OTHER PUBLICATIONS

Amazon, Collapsible Walking/Hiking Stick with Rifle Mount & Compass, https://www.amazon.com/SE-WS9HS-Collapsible-Walking-Compass/dp/B007U73468/ref=sr_1_3?ie=UTF8&qid=1523989738&sr=8-3&keywords=collapsible+walking+stick+with+rifle+mount, 9 pages, Jun. 4, 2018.
(Continued)

Primary Examiner — Rodney E Fuller
(74) Attorney, Agent, or Firm — Anthony J. Bourget

(57) ABSTRACT

A stick having an attachment device for tool-free quick release connection to another stick to form a shooting bipod or tripod and alternatively to connect to a weight-assist receiver of a backpack, the attachment device having a base configured to attach to the stick or to a handle of the stick, an integrally connected arm extending upwardly from the base, and integrally connected first and second fingers projecting outwardly from the base and configured to engage with a finger of a like attachment of the another stick and to alternatively engage within the weight assist receiver, the connecting fingers defining through holes configured to receive a quick-release pin where tool-free insertion or removal of the quick release pin through the through holes quick-connects or quick-releases the connecting fingers with or from the finger of the like attachment of the another stick and alternatively quick-connects or quick-releases the connecting fingers with or from the weight assist receiver.

21 Claims, 21 Drawing Sheets

(56) References Cited

U.S. PATENT DOCUMENTS

| | | | |
|---|---|---|---|
| 5,842,614 A | 12/1998 | Morrow | |
| D470,165 S * | 2/2003 | Peterson | D16/244 |
| 7,344,320 B2 | 3/2008 | Barker et al. | |
| 7,909,301 B2 * | 3/2011 | Faifer | F16M 11/041 |
| | | | 248/166 |
| 8,104,213 B2 * | 1/2012 | Keng | F41A 23/10 |
| | | | 42/94 |
| 8,590,440 B2 | 11/2013 | Gallo | |
| 9,568,270 B1 * | 2/2017 | LoRocco | F41B 5/1453 |
| 2003/0042388 A1 * | 3/2003 | Peterson | F16M 11/26 |
| | | | 248/440.1 |
| 2004/0066064 A1 | 4/2004 | Neely et al. | |
| 2005/0242250 A1 * | 11/2005 | Keng | F16M 11/10 |
| | | | 248/168 |
| 2008/0052979 A1 * | 3/2008 | Lee | F41A 23/04 |
| | | | 42/94 |
| 2010/0031985 A1 | 2/2010 | Decesari | |
| 2010/0084524 A1 * | 4/2010 | Faifer | F16M 11/041 |
| | | | 248/170 |
| 2015/0342312 A1 | 12/2015 | Khoshnood | |
| 2016/0135554 A1 | 5/2016 | Green | |
| 2017/0248385 A1 * | 8/2017 | Yehle | F41A 23/10 |
| 2018/0058794 A1 * | 3/2018 | Scalf | F41A 23/10 |

OTHER PUBLICATIONS

COLONEL100, Trekking pole threaded insert mod, Rokslide web page at http://www.rokslide.com/forums/diy-gear-modifications, Sep. 20, 2013, 7 pages.

Andrew Skurka, Myog: Bipod shooting sticks for hunting using trekking poles, http://andrwskurka.com, Oct. 27, 2014, 7 pages, Jun. 4, 2018.

Amazon, Vanguard Quest T62U Shooting Stick, https://www.amazon.com/s/ref=nb_sb_ss_i_2_15/140-2035564-9719257?url=search-alias%3Daps&field-keywords=vanguard+quest+t62u+shooting+stick&sprefix=vanguard+Quest+%2Caps%2C220&crid=1E5A579VQV6GZ, 8 pages, Jun. 4, 2018.

* cited by examiner

ATTACHMENT DEVICE FOR QUICK CONNECT OF TREKKING, SHOOTING AND WEIGHT ASSIST EQUIPMENT

BACKGROUND OF THE INVENTION

1. Field of the Invention

This invention relates to attachment devices, handles and sticks, including devices attachable to sticks for connecting the sticks to other objects or to sticks for creating shooting bipods, tripods, and weight assist devices.

2. Background Information

Trekkers, hikers, walkers, skiers and others use sticks to assist them in their activities. A typical trekking stick includes a handle or grip at one end and a basket near the bottom end of the stick or shaft. Sometimes a strap is associated with the handle to allow a user to better secure the stick. The basket is designed to stop the pole from sinking significantly into deep snow or soil, and can range from being small, aerodynamic cones used in racing, to large snowflake shaped baskets which are used in powder skiing. The shaft or stick may telescope and adjust to fit the length desired by the user. There have been a variety of devices which combine walking or skiing sticks for various purposes, such as the devices shown in U.S. Patent Application No. 2016/0135554, or U.S. Pat. Nos. 5,842,614, 7,344,320 or 8,590,440. While some device have benefits, there is room for improvement.

SUMMARY OF THE INVENTION

The invention pertains to a combination trekking stick, shooting bipod, shooting tripod and backpack weight assist, and stick attachment devices for use with such equipment. In one aspect the invention is an attachment device configured to connect to a shaft of a stick (or having a grip which connects to a shaft of a stick) and designed to allow the stick to quick-connect to another stick to form a bipod or tripod. The same attachment device in association with a stick forms a weight assist, such as when connected to a receiver of a backpack frame. The attachment device includes a base configured to be positioned atop a stick, such as by connecting the device directly to a top or handle of a stick or integrating the base with a grip which is slid upon the stick. From the base projects an integrally connected arm extending upwardly from the base and a pair of connecting fingers projecting outwardly from the base and defining a through hole passageway configured to receive a quick-release pin such that insertion of a pin through the through hole passageway connects two sticks together. The quick-pin is tool-free in that it inserts and removes from the through hole without the use of tools such as a screwdriver or wrench. Such quick-pin action allows a trekker to quickly combine sticks or trekking poles to establish a shooting bipod. The bipod may also be quickly dismantled so the trekking poles may continue to be used for trekking. The quick pin inserts into a pin holder for storage when not being used to connect sticks together.

In a further aspect the invention includes a stick attachment device for tool-free quick release connection of a stick to an object, the attachment device having a base configured to be positioned atop a stick, an arm extending upwardly from the base, and a first connecting finger projecting outwardly from the base and defining a through hole configured to receive a quick-release pin such that tool-free insertion or removal of the quick release pin through the through hole quick-connects or quick-releases the first connecting finger with or from the object. In one aspect the object is another stick having the same or similar attachment device. In other non-limiting aspects the object is a weight assist receiver positioned or positionable on a frame of a backpack.

In one aspect the invention includes a handle or grip configured to connect to another handle or grip. The handle is configured to be connected to a stick such as a trekking stick so that the trekking stick is connectable to another trekking stick having a like handle or grip. The connected sticks form a shooting bipod. A quick-detach pin secures the sticks together. In one aspect the pin is positioned atop a third stick such that when the pin is inserted to form the bipod device, a tripod is constructed. In some aspects a zero clearance or tight-fit clearance arrangement is created between respective finger projections of the sticks and kept in place by the quick-detach pin. The handle, grip or stick attachment device in one aspect is a single molded piece that can easily attach and detach to a second stick without any form of tools. Once connected, two sticks form a "U" shape on the top of the sticks to be used as a rest for a camera or firearm as a shooting stick. An optional third stick can be attached via an adaptor or port in either of the first two sticks to provide more stability. An optional spotting scope or camera shelf adaptor can be attached to the U shaped structure.

In a further aspect the invention is a device having a first stick having a tool-free quick release stick attachment having a first arm extending upwardly from a first base, and a first connecting finger projecting outwardly from the first base and defining a first through hole, a second stick having a tool-free quick release stick attachment having a second arm extending upwardly from a second base, and a second connecting finger projecting outwardly from the second base and defining a second through hole, and a quick release pin positioned through the first through hole and the second through hole connecting the first stick to the second stick, the pin and first and second connecting fingers configured for tool-free quick-insertion and quick-release of the pin.

In a further aspect the invention includes a stick attachment device for tool-free quick release connection of a stick to an object, the stick attachment device having a base configured to be positioned atop a stick, an arm extending upwardly from the base, and a first connecting finger projecting outwardly from the base and defining a through hole which aligns with a through hole of the object and is configured to receive a quick-release pin therethrough, the arm configured to insert within a gap defined by the object, the arm having a concave top surface configured to abut against a convex surface of the object and having a convex outside surface configured to abut against a concave surface of the object in part defining the gap of the object. Insertion of the pin through the through hole while the arm is positioned in the gap locks the stick to the object. In one aspect the object is a weight assist receiver connected to a backpack.

In a further aspect the invention includes a stick receiver for mounting to a frame of an object such as a backpack and for receiving a stick to provide weight assist of the object, the stick receiver having a housing 105 connected to a frame mount 110 and configured to receive a stick within a gap defined by the housing, the frame mount configured to mount to a frame element of the object, the stick having a shaft configured to abut a ground surface to provide weight-assist to the object, the housing having a core 107 with a receiver wall configured to receive a top surface 38 of an arm extending upward from the stick, the gap defined in part by the core 107 and a stop 106 of the housing, the stop having a curved surface to match a convex curve surface of the arm so as to lock the arm into position. The stick receiver is made symmetrically so that whatever side of the backpack frame it is mounted an inserted arm will be received and locked into position with curved surfaces abutting a corresponding curved surface of the core and of the stop. The receivers in one aspect are mounted on a backpack frame where they receive the detachable trekking sticks. The sticks or poles can be telescoped outward to become a weight pack assist (or inward for transport and storage; or detached altogether). The backpack wearer can use the attached poles as support to hold the weight of the backpack when resting or the poles can be used to hold the backpack up when not being worn.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
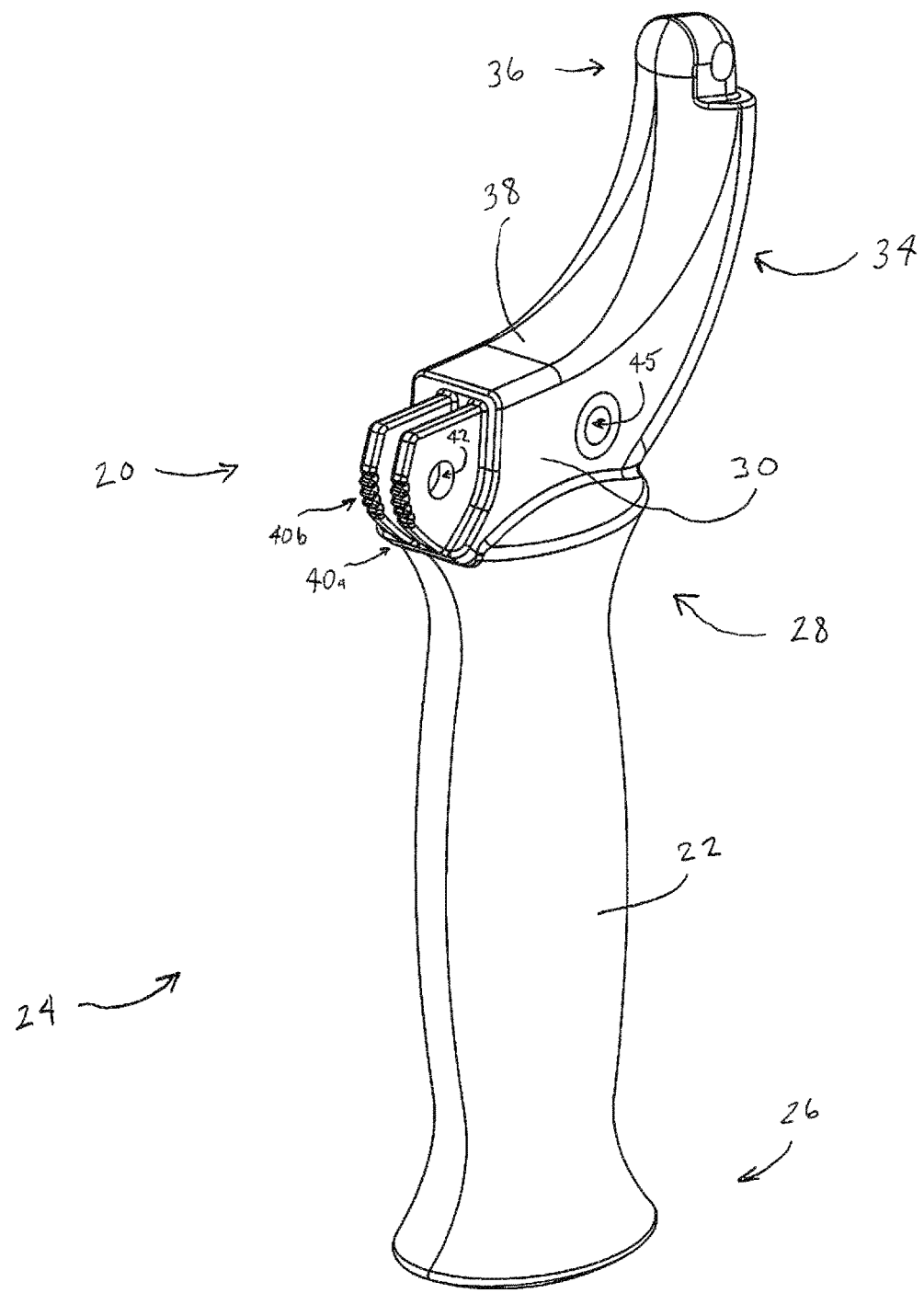
FIG. 1 is a perspective view of a device made in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 3:
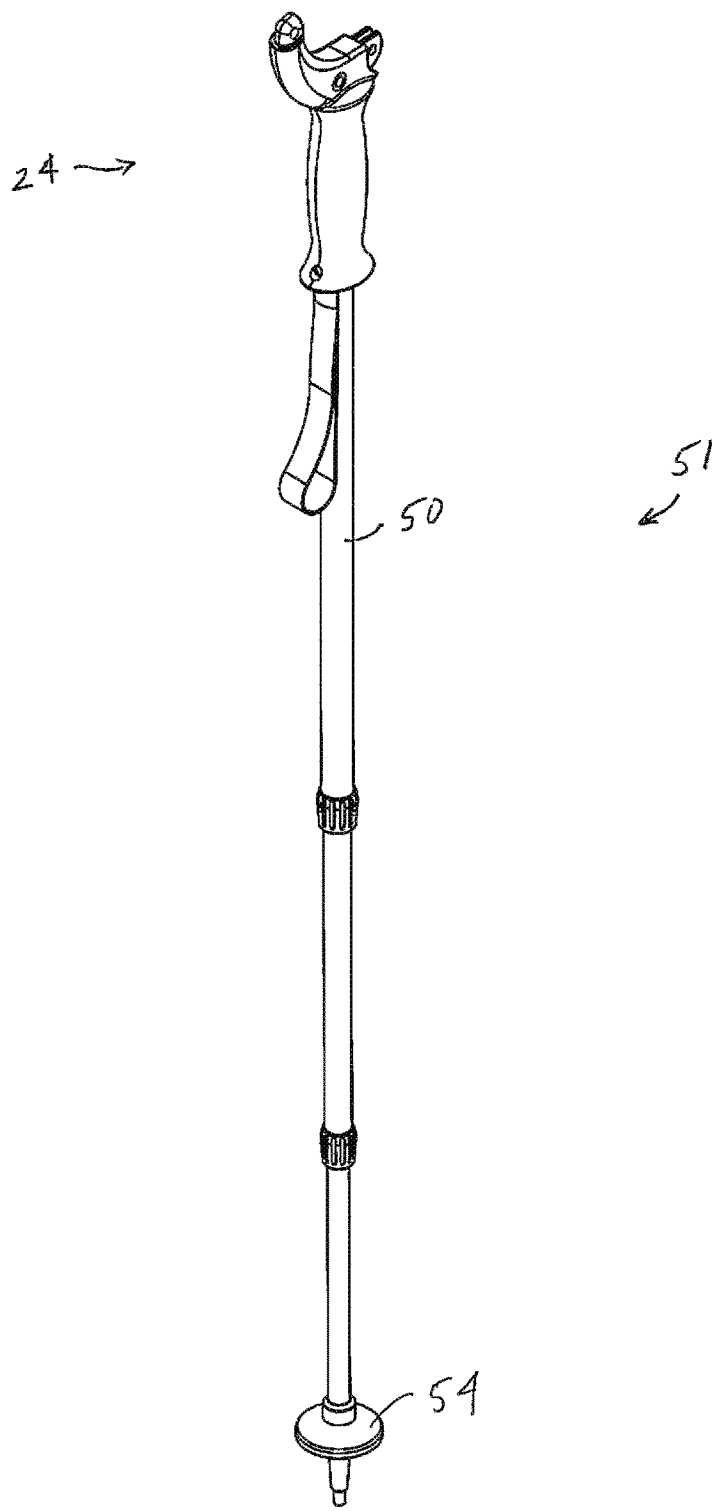
FIG. 3 is a perspective view of a stick aspect of the present invention with the device of FIG. 1 connected to a representative stick.
Figure 4:
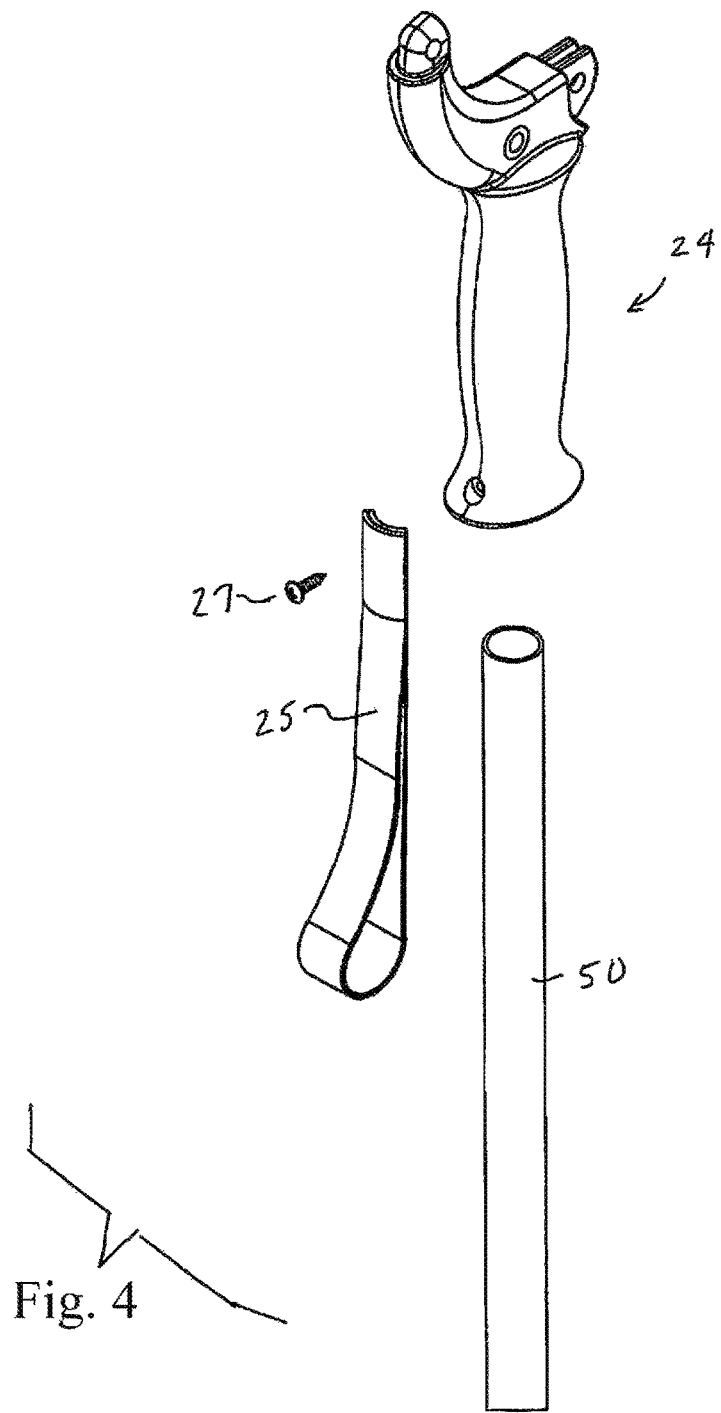
FIG. 4 is a partial exploded perspective view of the stick of FIG. 3.
Figure 5:
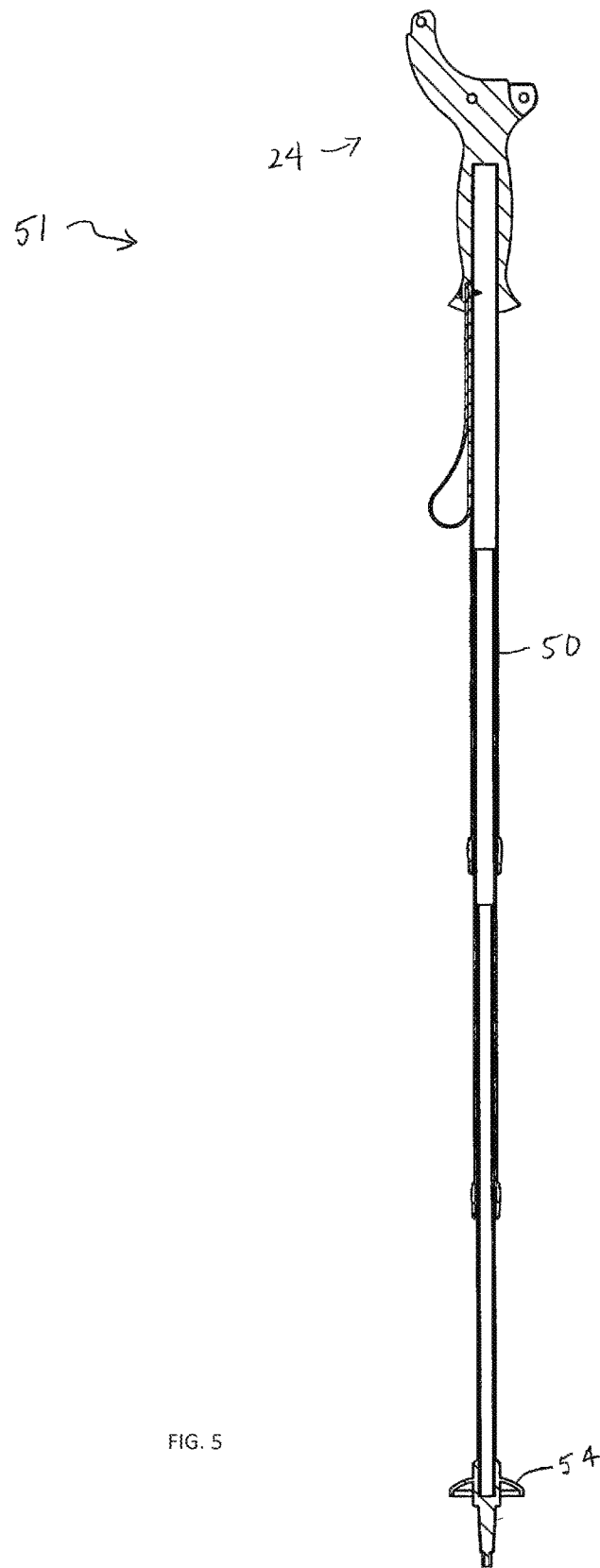
FIG. 5 is a section view of the stick of FIG. 3.
Figure 6:
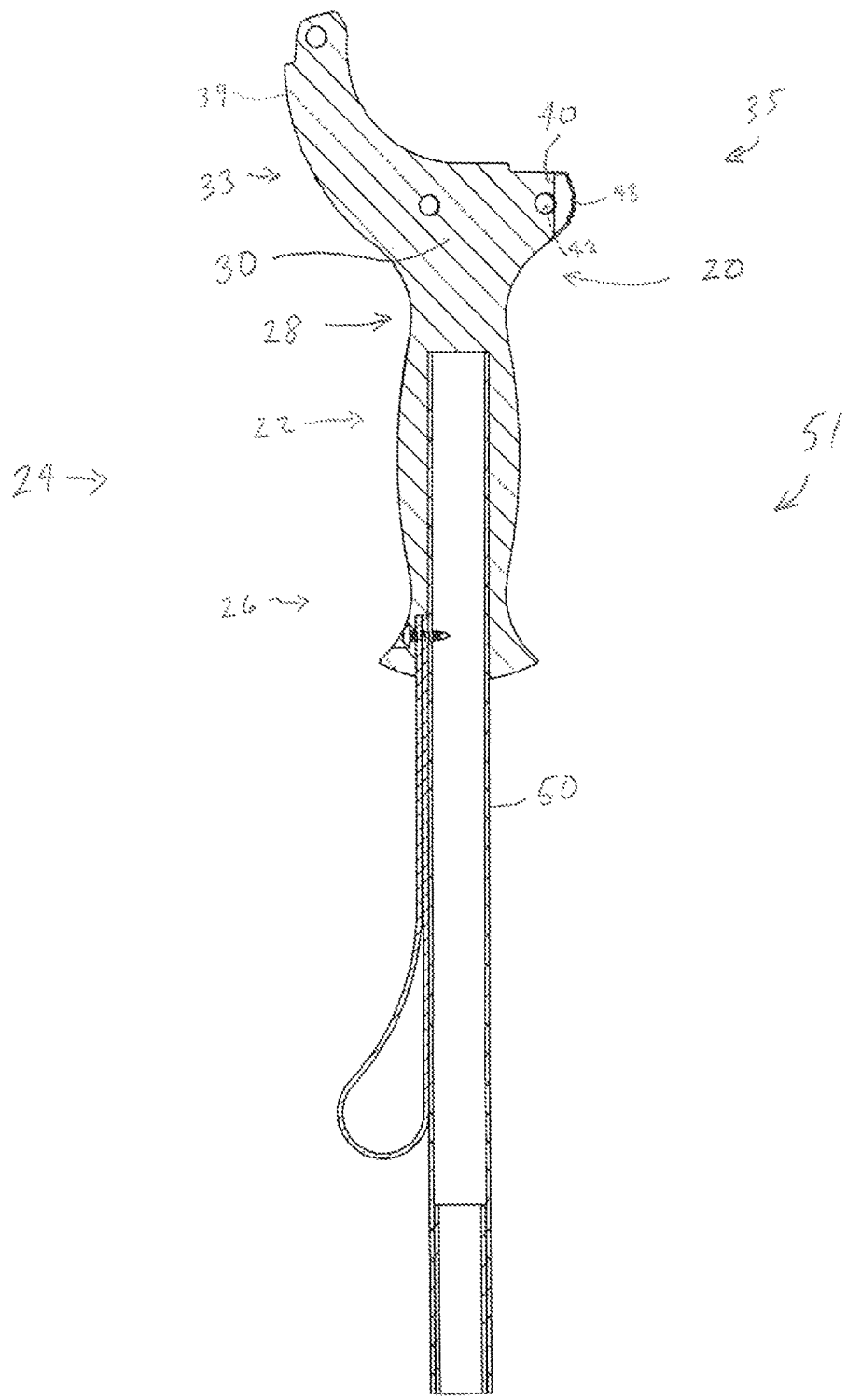
FIG. 6 is a partial enhanced perspective view of the device of FIG. 3.

Referring to FIGS. 1-21, aspects of a handle and associated devices of the invention are shown. In one aspect, the invention includes a stick attachment device 20 which is connected to a grip 22 to form a handle 24 as shown in FIG. 1. Handle 24 is configured to connect to a shaft 50 of a first stick 51 as shown in FIG. 3. In one aspect, device 20 is connected to grip 22 by use of a fastener or other connection means. For instance, device 20 may include a threaded fastener which inserts into a threaded receiver of a grip or handle of a stick, or device 20 may include a threaded receiver which receives a threaded fastener for connection of device 20 to the grip or handle of a stick. Device 20 may thereby screw or thread into connection with grip 22 or onto the handle of a stick. Other means for connecting device 20 to grip 20 may also be used, such as with a fastener or fasteners, friction fit, adhesive bond and/or clasps. In other aspects, as shown in FIG. 1, stick attachment device 20 is integrally connected to grip 22. Grip 22 includes a mouth leading to a generally cylindrical cavity at a bottom portion 26 of handle 24 to receive therein a shaft 50 of a stick such as first stick 51. Referring to FIGS. 4-6, handle 24 receives shaft 50. A set screw 27 or other fastener is used in one aspect to secure handle 25 to the shaft 50 and stick 51. A strap 25 may be included with the handle 24 as shown. Shaft 50 may be a shaft associated with a stick 51 or pole such as a trekking stick 51, ski pole, shooting bipod, tripod, receiver, or other structure.

At an upper portion 28 of handle 24 or of grip 22, or on top of grip 22 is positioned a base 30 having an upward extending arm 34. Arm 34 extends from base 30 at a first side 33 of device 20. A finger 40 or fingers 40*a*, 40*b* are positioned opposite arm 34 at a second side 35. In one aspect arm 34 includes a smooth concaved surface spanning to a head portion 36. The smooth concaved top surface 38 is configured to receive at least a part of a camera or firearm to be supported by device 20 and a corresponding stick 51 or sticks. The head portion 36 projects generally upward from arm 34. The finger 40 or fingers 40*a*, 40*b* extend generally outward from base 30. In one aspect, fingers 40 are oriented generally perpendicularly to head portion 36.

Figure 2:
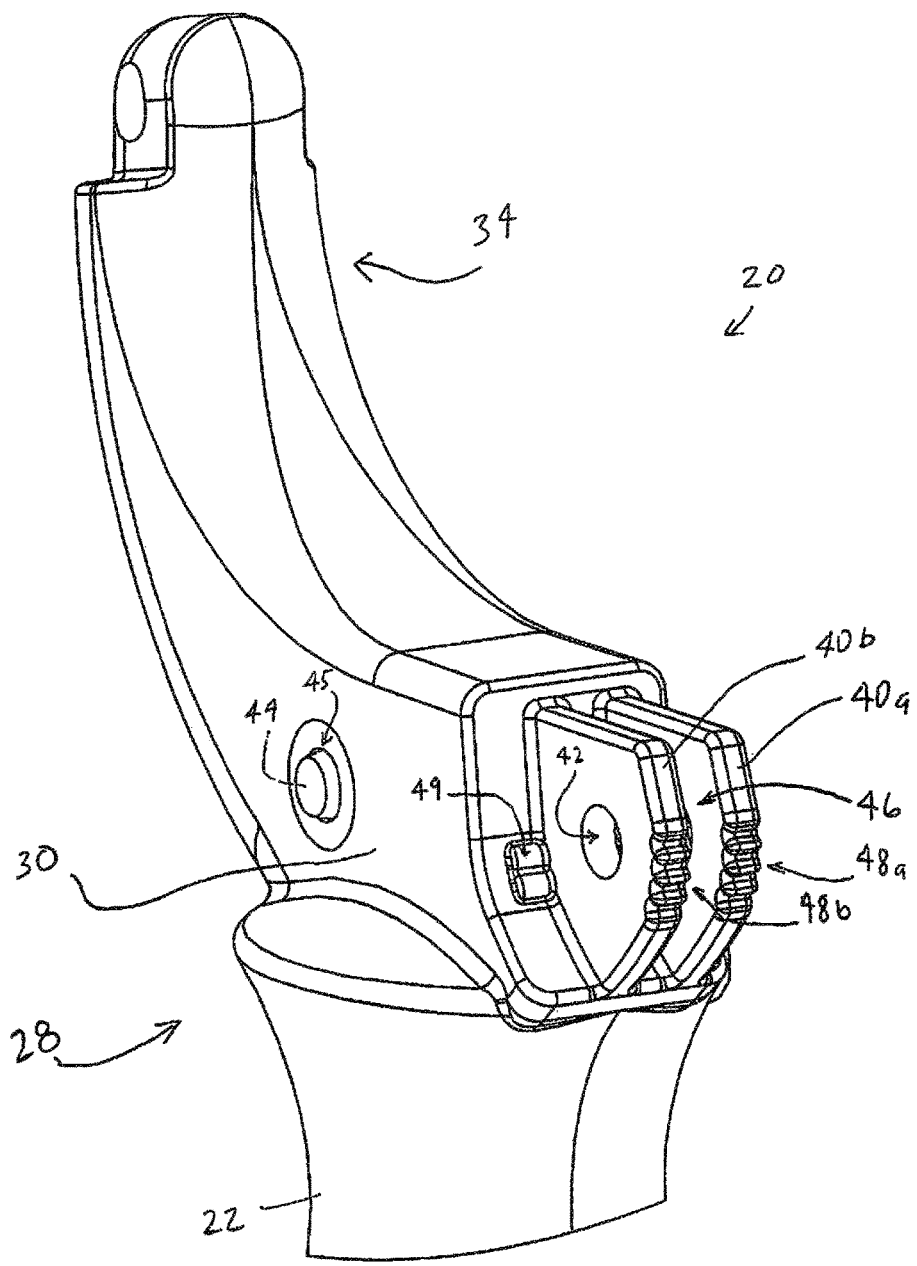
FIG. 2 is a partial reverse enhanced perspective view of the device of FIG. 1.

As shown in FIGS. 1 and 2, fingers 40*a*, 40*b* each define a through hole 42 configured to receive a quick-release pin 44. The respective through holes 42 are aligned so that a single pin 44 passes there through. Fingers 40*a*, 40*b* are spaced apart and form a gap or slot 46. Slot 46 is configured to receive a finger 40 of a like attachment 20 as addressed further below. Fingers 40 also include teeth 48 comprising a set of grooves which mesh with ribs 49 of a like attachment 20.

In further reference to FIG. 3, stick attachment device 20 which is part of handle 24 is attached to shaft 50 of first stick 51. In this example shaft 50 is segmented and telescopes with a twist-lock mechanism for convenient length adjustment. A basket 54 may be positioned near the bottom of stick 51 to provide trekking, skiing, walking or other support.

Figure 9:
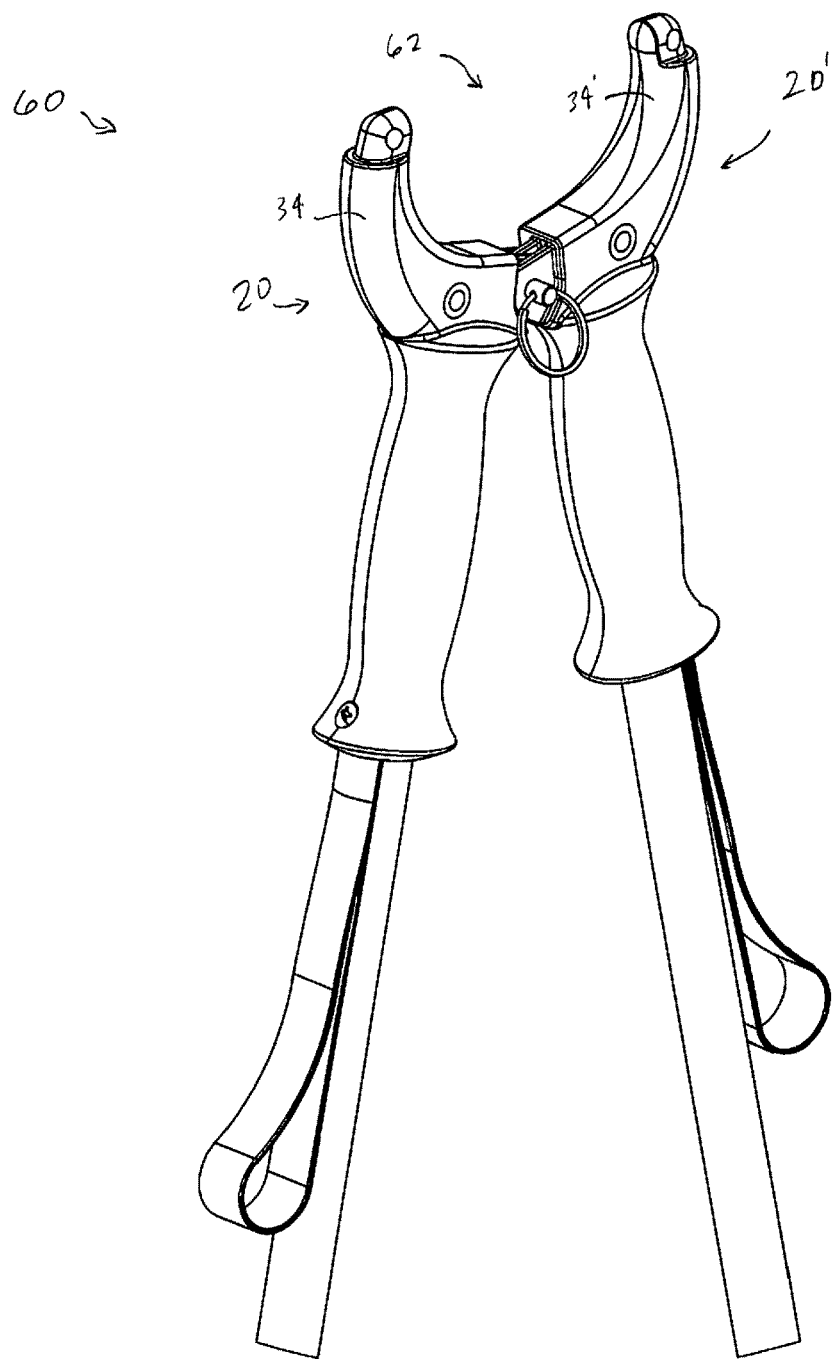
FIG. 9 is an enhanced partial perspective view of the bipod device of FIG. 7.
Figure 10:
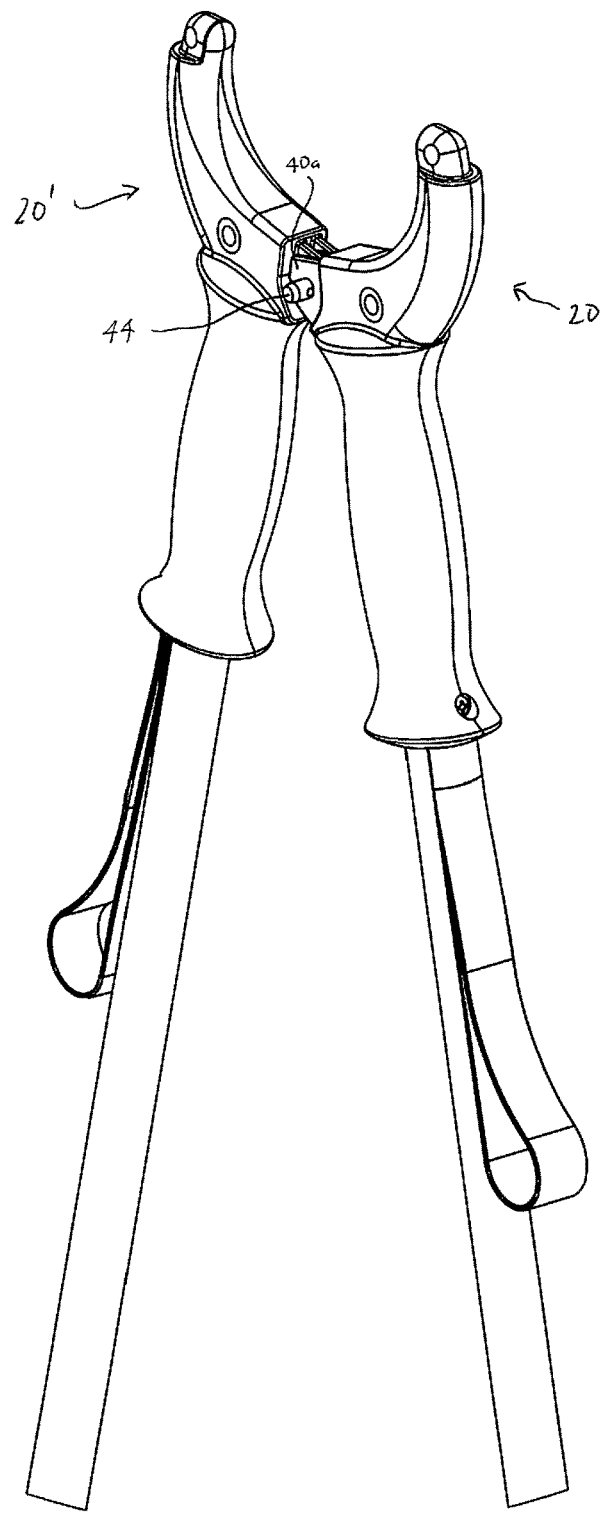
FIG. 10 is a reverse angle view of the device of FIG. 9.

In operation device 20 and/or handle 24 accommodates quick-connect and quick-release connection of sticks 51, 52 to form a shooting bipod 60. With reference to FIGS. 7-10, a stick 51 includes a handle 24 and/or stick attachment device 20. Another stick 52 includes a like stick attachment device 20, and in the example shown, the attachment device 20' of stick 52 is identical to the attachment device 20 of stick 51. Device 20 is designed such that an identical device 20' is interconnected with itself. For instance, and with reference to FIG. 8, finger 40b is positioned such that it fits within slot 46' defined by device 20'. Likewise, finger 40b' is positioned such that it fits within slot 46 (See FIG. 2 for further reference to slot 46) defined by device 20. Fingers 40b and 40a are off-set from the center of base 30 so that when rotated 180 degrees, fingers 40a, 40b align with its former self, i.e., finger 40b inserts into the slot 46 defined by finger 40b and finger 40a. In this manner, a single design for device 20 accommodates use of identical devices 20, 20' for efficient operation and efficient manufacture because only a single mold or set of molds is required for manufacture. A first device 20 may be rotated 180 degrees to interlock with an identical second device 20'. Having a single design also provides efficiencies where multiple devices 20 are used because all of the devices may interconnect among the group of devices for efficient organization and use. Devices 20, 20' are interchangeable. As shown in FIG. 9, device 20 and identical device 20' are interlocked by insertion of fingers 40 into respective slots 46. Pin 44 is inserted through through holes 42 defined by the four fingers 40. In one aspect, slot 46 is configured such that a finger 40b inserted into slot 46 will friction fit therein, or at least partially friction fit therein. A tight tolerance between respective surfaces provides a friction fit. Insertion of pin 44 further secures interlocked fingers 40 together. Once pin 44 is inserted, respective sticks 51, 51 are fixed into an angularly connected position as generally shown. Teeth 48 mesh with ribs 49 of respective devices 20, 20' to further lock the fingers 40 together. A different locked angular connection may also be achieved by modifying the angle between sticks 51, 52 prior to interlock such that teeth 48 abut ribs 49 at a different angle. The set of teeth 48 and ribs 49 accommodate adjustment to the different angular connections. In further aspects, teeth and ribs are configured to allow for a ratcheting arrangement to allow angular adjustment while pin 44 is in position. As shown in FIG. 10, pin 44 extends through the through holes 42. In one aspect, pin 44 is a metal ball detent pin, sized such that the detent ball passes through finger 40a. Pin 44 may alternatively pass through in the reverse direction so that detent ball passes though finger 40a'. Pin 44 (and device 20) is "tool-free" in that no tools are required to insert or remove pin 44 from device 20, 20' (or no tools are required to connect or disconnect one device 20 from another device 20'). Such tool-free insertion or removal of pin 44 achieves a quick release and quick connect feature. An operator may therefore connect and disconnect devices 20, 20' and respective sticks 51, 52 without having to use a separate tool such as a screwdriver, wrench or other tool. The pin 44 hingedly secures respective devices 20, 20' together. No bolt or screw or nut or other hardware is required. The interlocking fingers 40 hinged together with pin 44 creates a stable structure that does not loosen or detach, thus a bolt and nut configuration is avoided. Once fingers 40 are interlocked so that through holes 42 are all in alignment, pin 44 is easily inserted to lock the fingers 40 together. Operation is achieved by a simple insertion of pin 44 to overcome the force of the ball detent. The pin is secure until an outward removal force is applied, which is easily accomplished by grasping the ring at the end of pin 44 and pulling outward. A pin holder 45 accommodates insertion and storage of a pin 44 for handy or convenient use. Once the pin 44 is removed from through hole 42, it may be stored at pin holder 45. A pin 44 may be stored in the various pin holders 45 of device 20, 20' for use as needed, and for quick connect or disconnect of respective sticks 51, 52.

Figure 7:
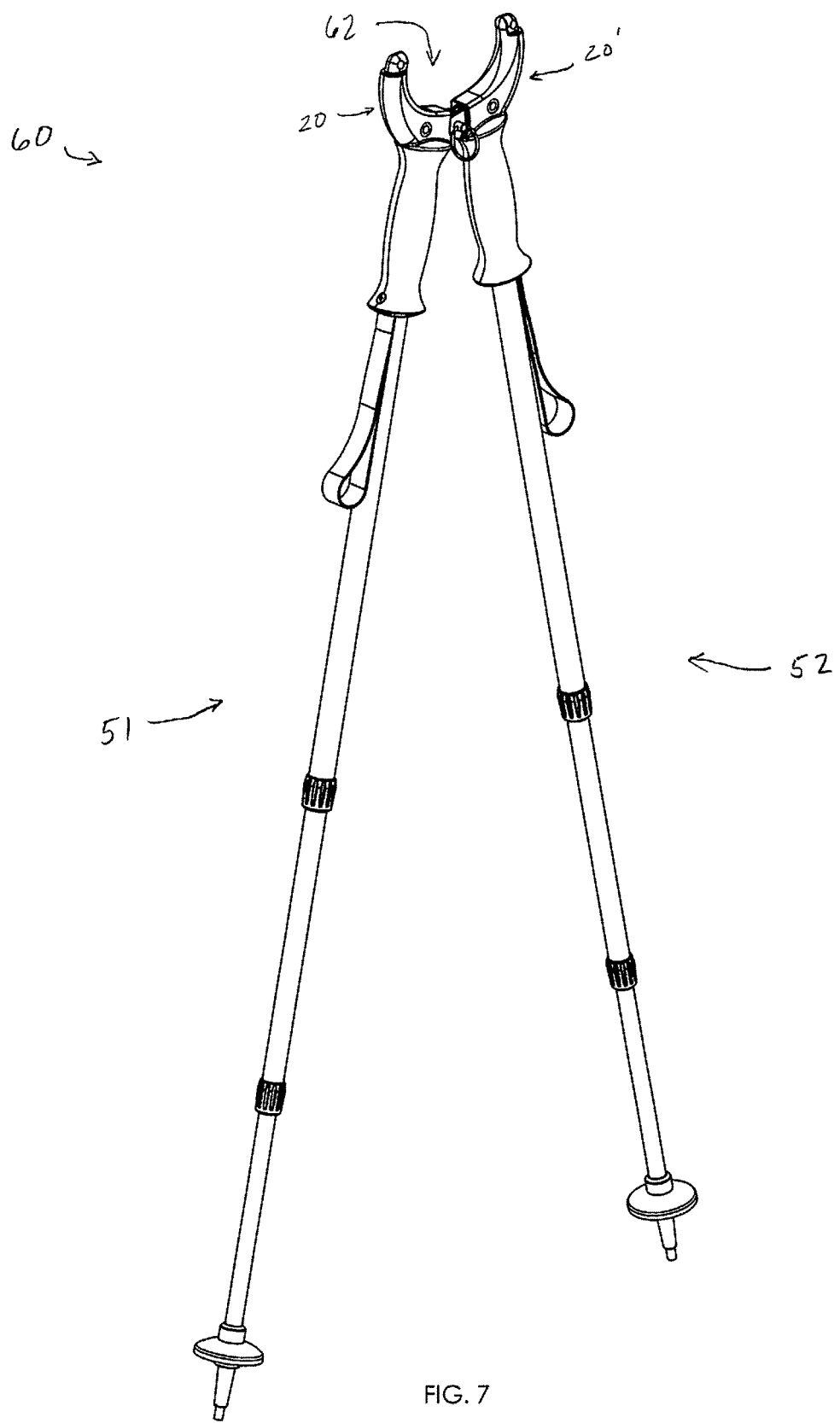
FIG. 7 is a perspective view of a bipod device in accordance with a further aspect of the invention with the stick device of FIG. 3 connected to a like device.
Figure 8:
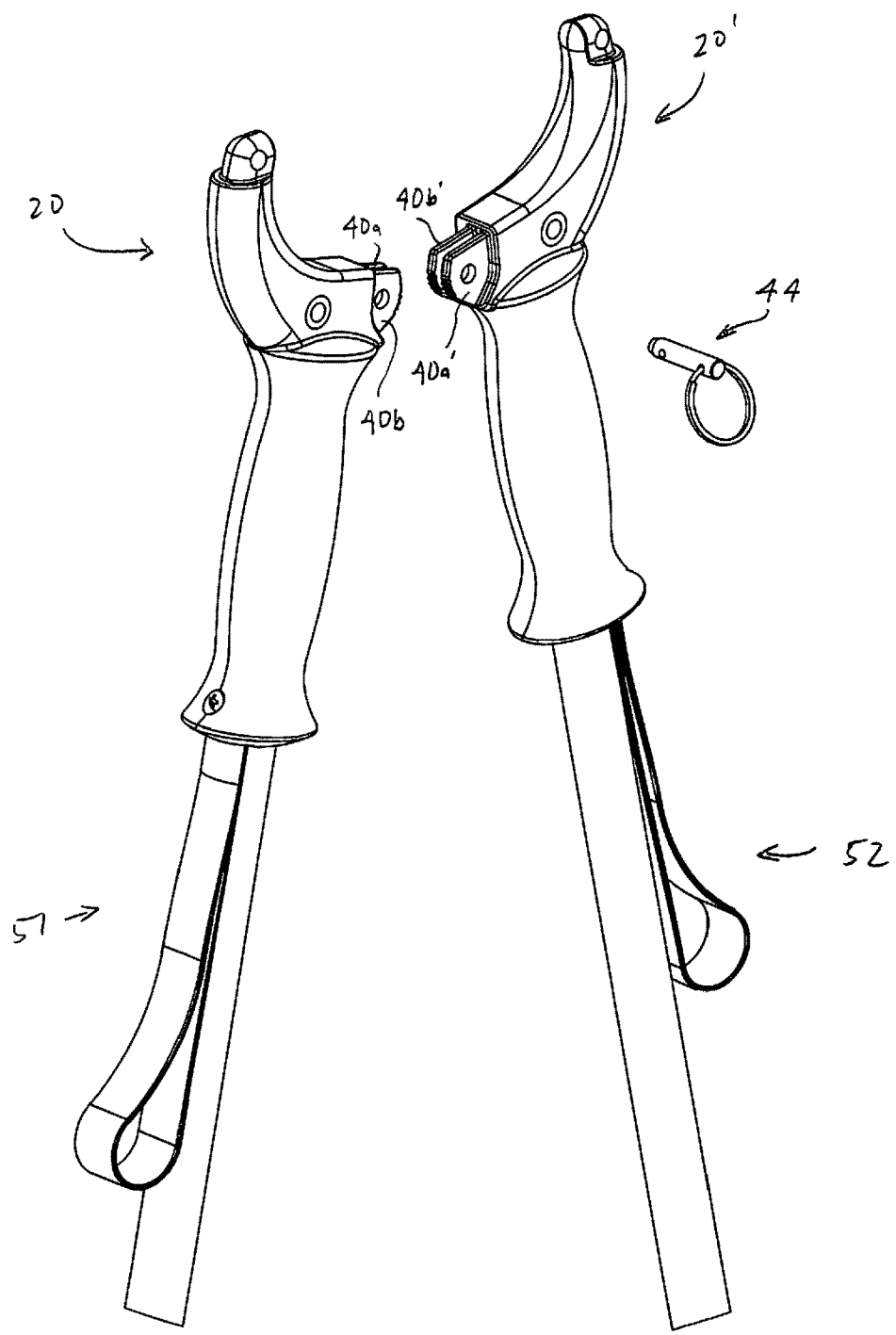
FIG. 8 is an exploded partial perspective view of the bipod device of FIG. 7.

As shown in FIG. 7, bipod 60 includes sticks 51, 52 which are height adjustable to accommodate stabilization for shooting of a camera or use of firearm or for stabilization of objects for other purposes. In operation, a photographer or hunter may place his or her camera or firearm in the cradle 62 formed by the arms 34, 34'. The smooth and curved top surface 38 of arms 34 cradle the barrel of the camera or firearm and allow the user to stabilize for a shot.

Figure 11:
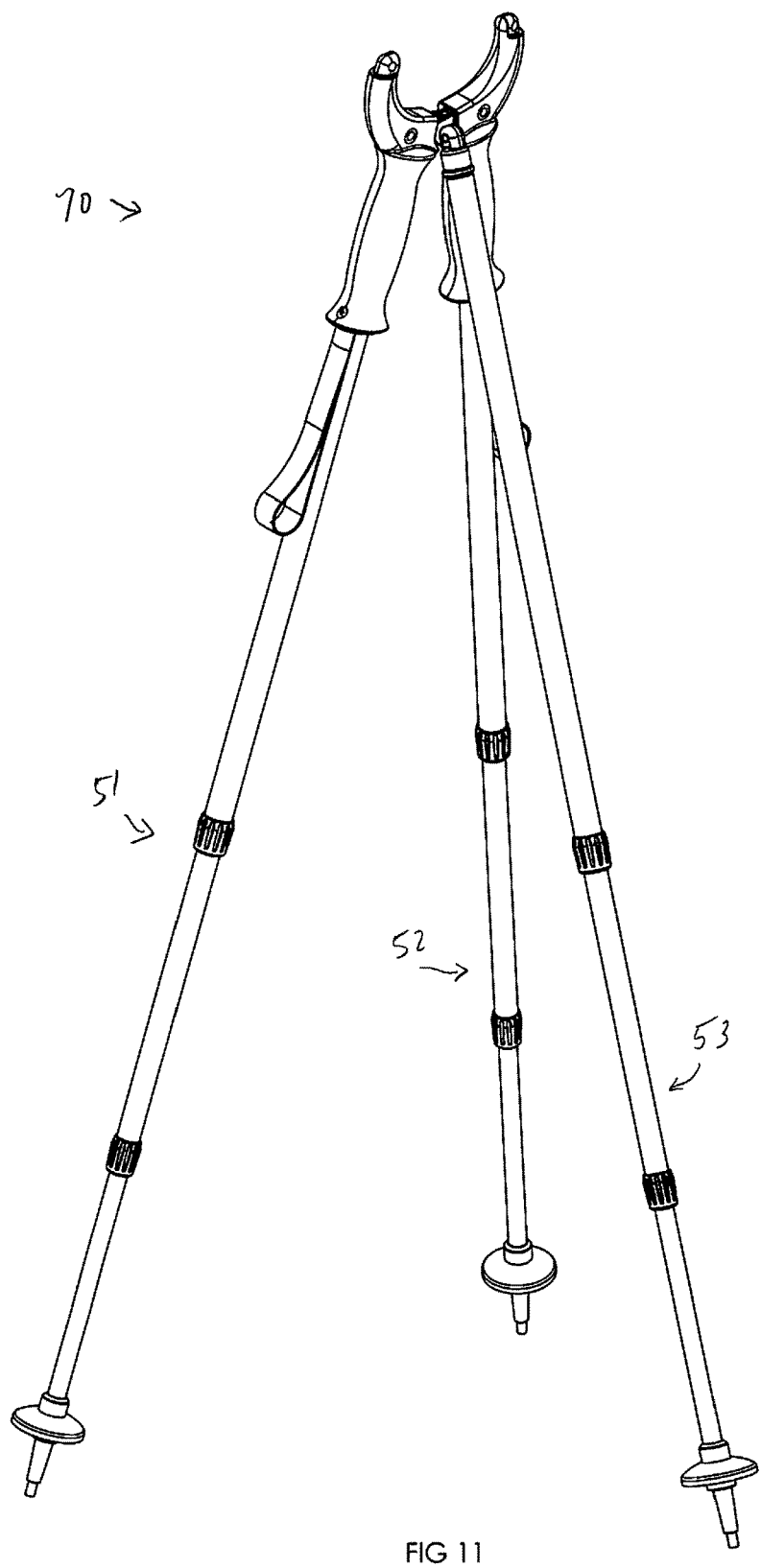
FIG. 11 is a perspective view of a tripod device in accordance with a further aspect of the invention with a stick connected to the bipod device of FIG. 7.
Figure 12:
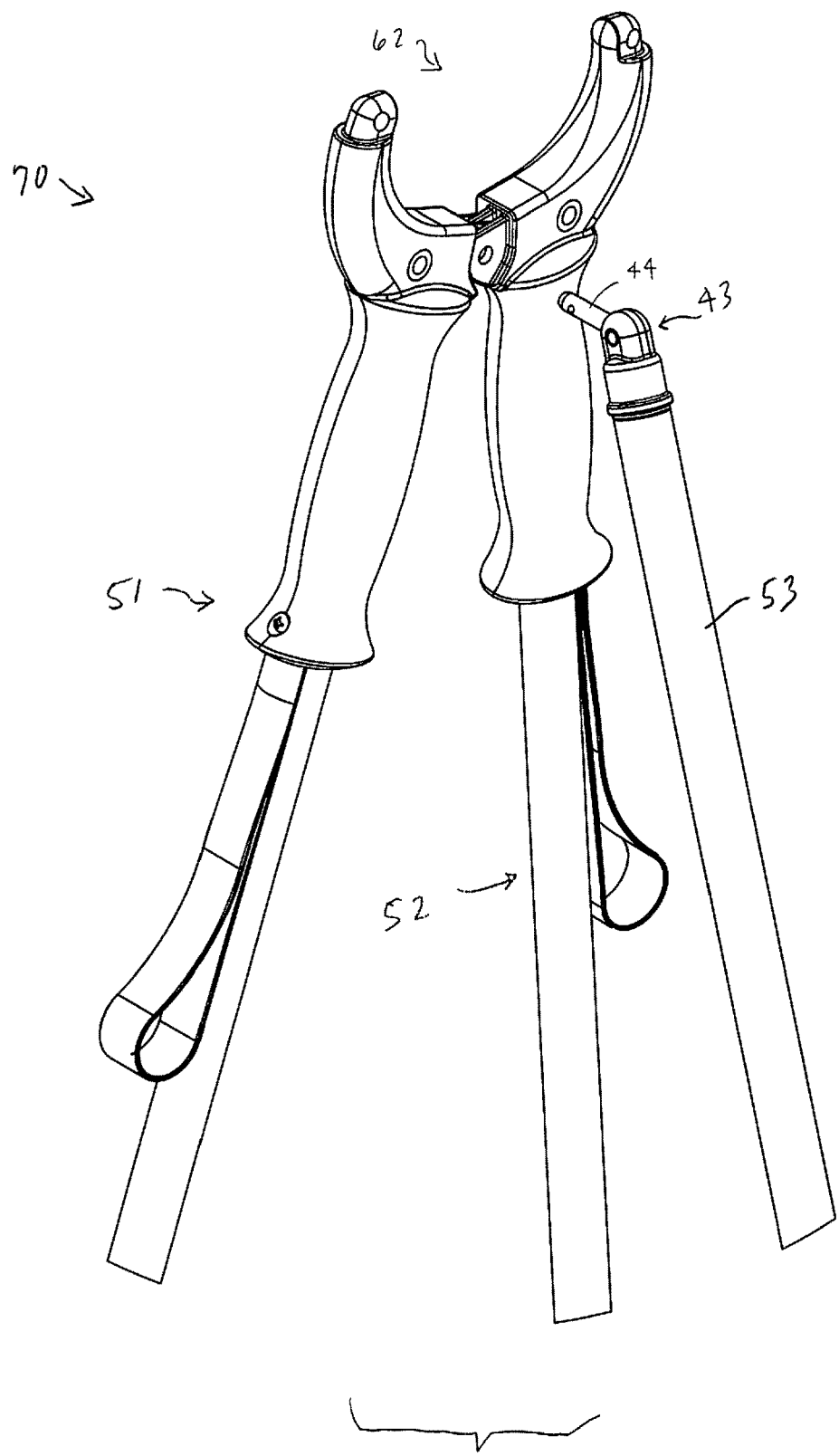
FIG. 12 is a partial exploded perspective view of the tripod device of FIG. 11.
Figure 21:
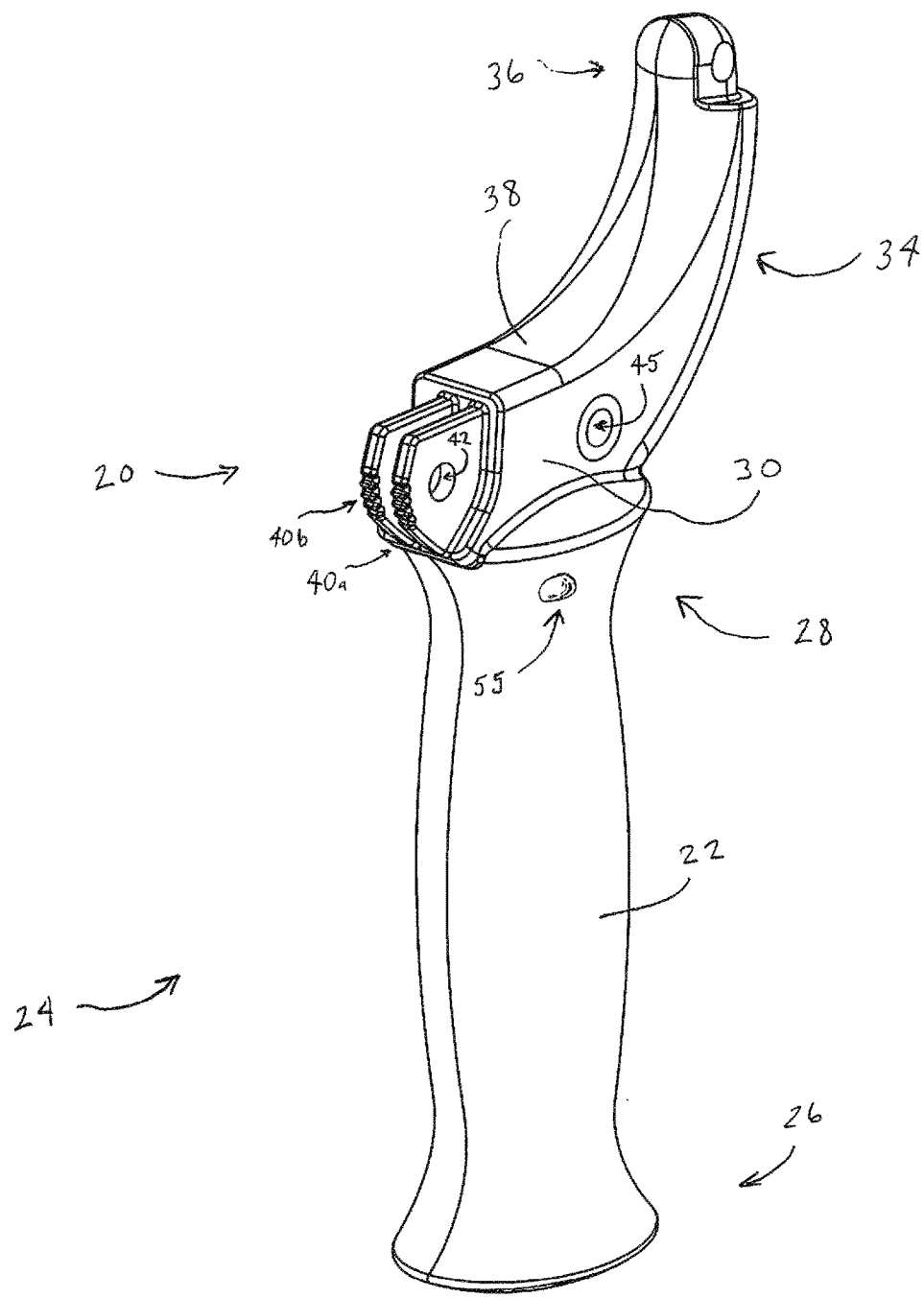
FIG. 21 is a perspective view of the device of FIG. 1 and showing a further component.

With reference to FIG. 11 and FIG. 12, pin 44 is connected to a third stick 53. Insertion of pin 44 transforms bipod 60 into a tripod 70, having sticks 51, 52, 53. Stick 53 may also be an adjustable telescoping stick. In one aspect, pin 44 is pivotally connected with pin pivot 43. Pin pivot 43 may also be friction fit (plug into or upon) with stick 53 or may include threads for threaded connection with stick 53. If a user experiences a broken stick or a lost pin, stick 53 may be used to provide the needed stick or pin parts by separating pin pivot from stick 53. Pin 44 locks together respective devices 20, 20' (and sticks 51, 52) while simultaneously providing a third leg 53 for tripod support. With a tripod 70 the operator experiences a desired stability for shooting photographs and/or using firearms. With reference to FIG. 21, an insert 55 such as a threaded insert is positioned within grip 22. The insert 55 is positioned with a downward angle orientation. In one aspect the insert 55 is located at a grip portion where the surface naturally projects somewhat downward. The insert is configured to receive a threaded male component of the third stick 53. For instance, instead of using a pin 44 connected at an end of third stick 53, a threaded pin is used for threaded engagement within insert 55. The third stick 53 may screw into insert 55 much like occurs with insertion of a handle into a head of a broom. When sticks 51, 52 are connected together as in FIG. 12, there will be an insert 55 on both sides of the bipod 60 so that the third stick 53 may be inserted into either side of bipod 60 to form tripod 70. The angular orientation of insert 55 accommodates angular projection of stick 53. A pin pivot 43 may also be used in conjunction with a threaded pin for the insertion.

Figure 13:
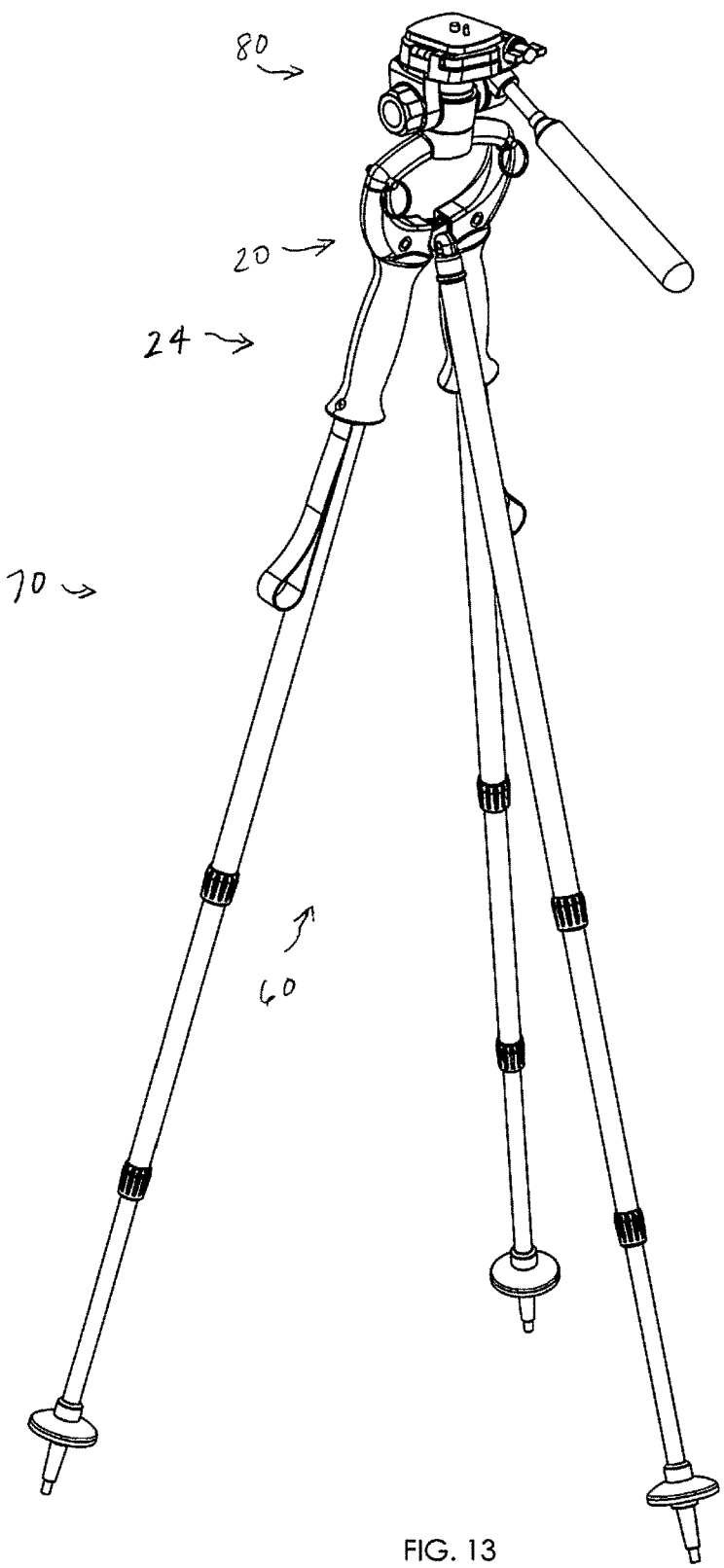
FIG. 13 is a perspective view of the tripod device of FIG. 11 with further aspects.
Figure 14:
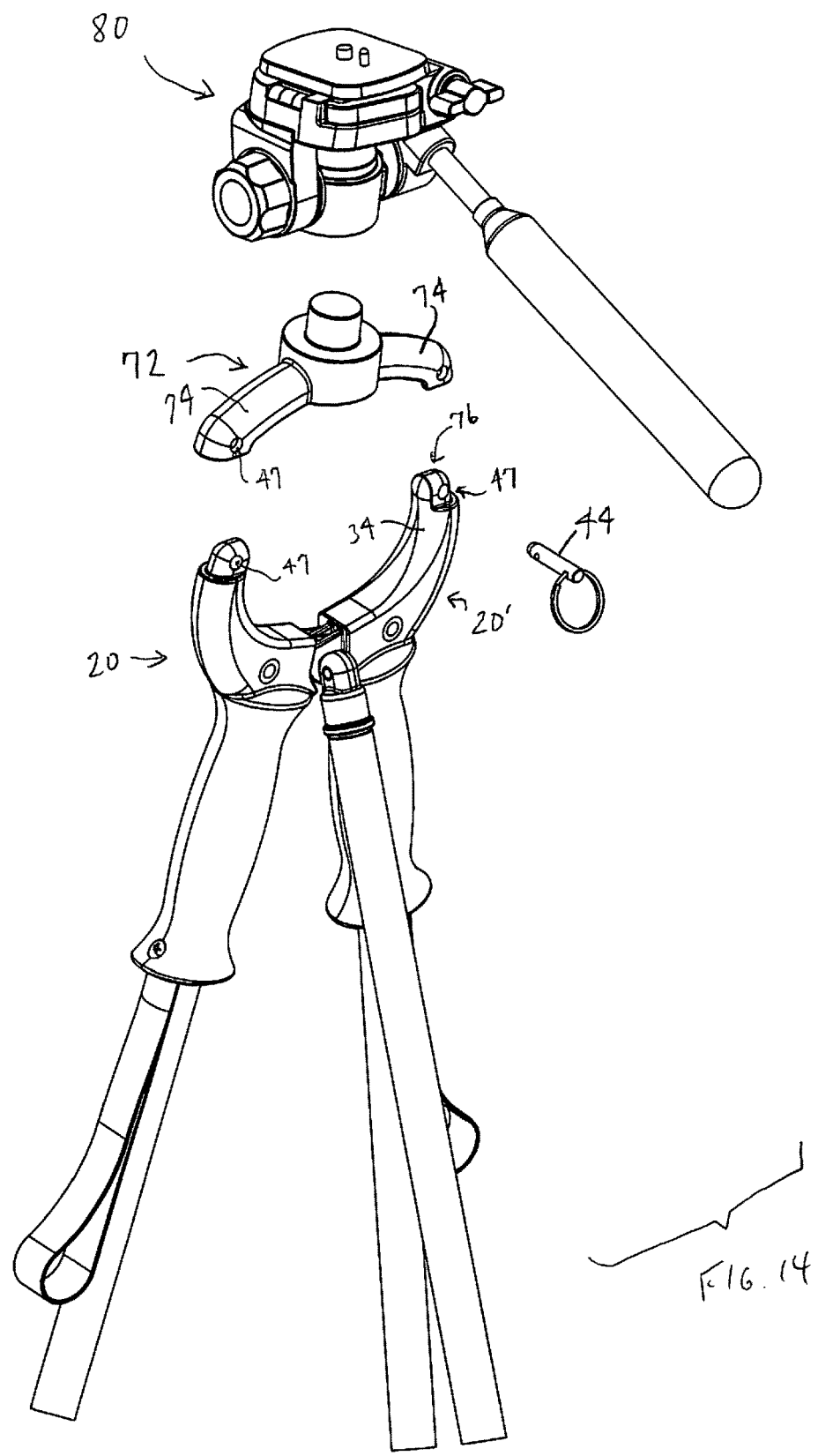
FIG. 14 is a partial exploded perspective view of the device of FIG. 13.
Figure 15:
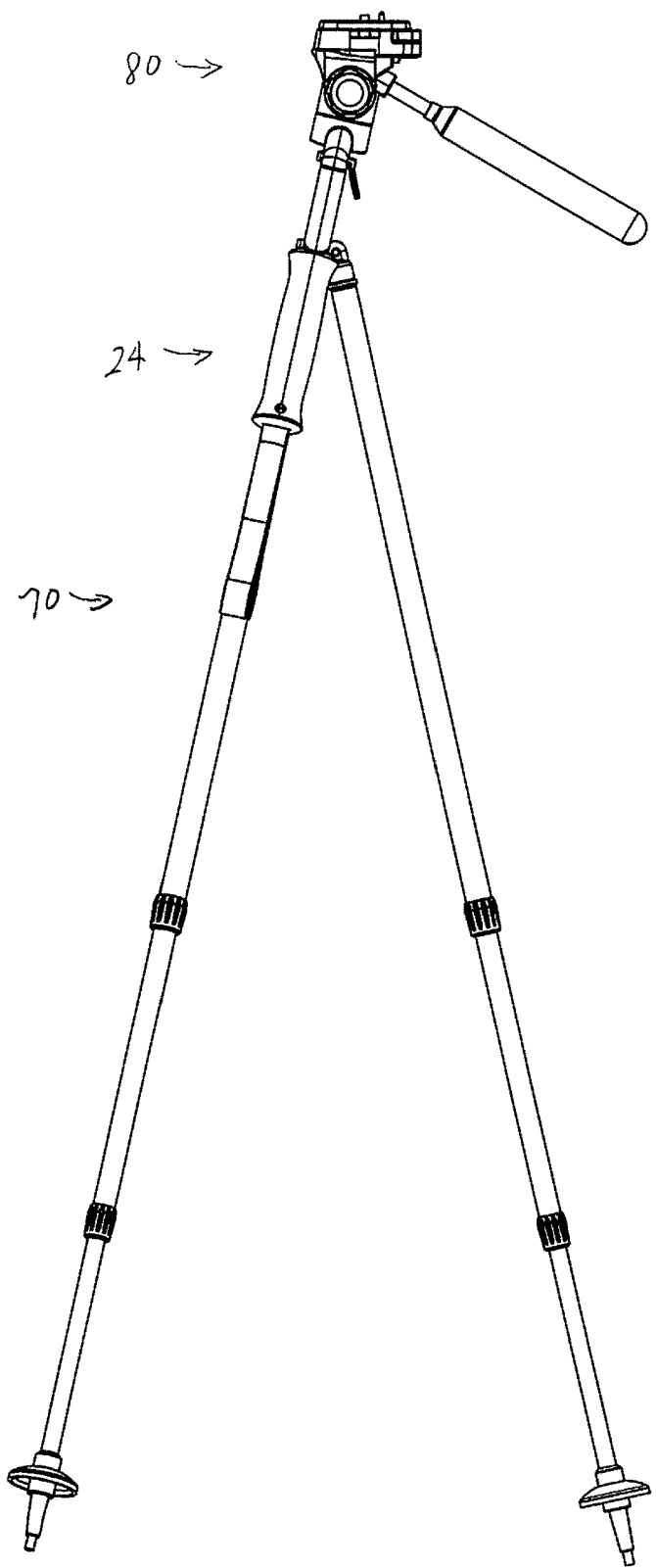
FIG. 15 is a left side view of the device of FIG. 13.
Figure 16:
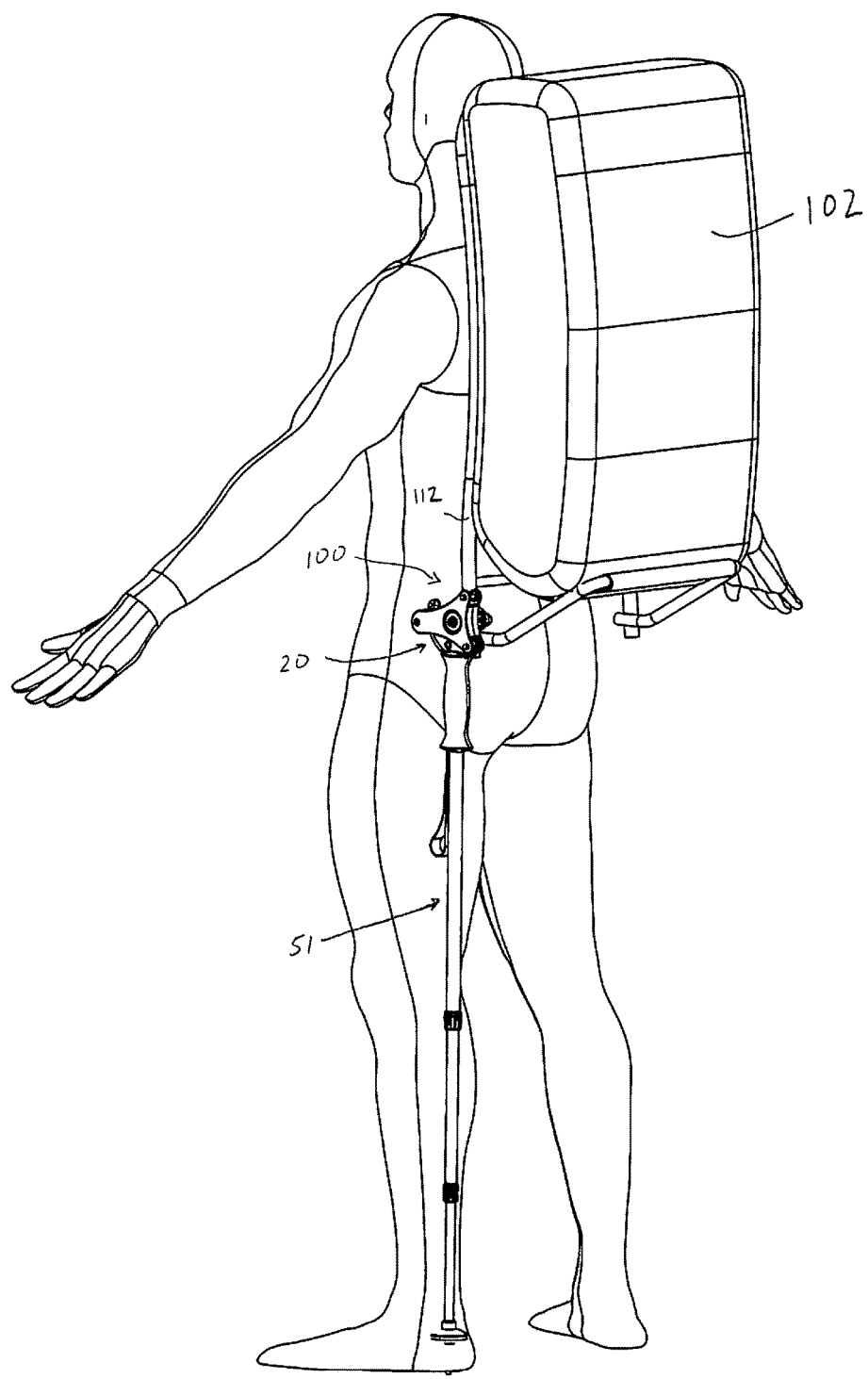
FIG. 16 is a perspective view of a further aspect of the present invention and showing the device of FIG. 3 in a representative assist aspect of the invention.

With reference to FIGS. 13-15, arms 34 of devices 20, 20' are configured to receive a cap 72. In one aspect, cap 72 includes a shoulder 74 configured to fit upon a head 76 defined by arm 34. In one aspect shoulder 74 and head 76 both includes a pin hole 47 which align and are configured to receive pin 44. A pin 44 inserted into the aligned pin holes 47 of head 76 and shoulder 74 secure cap 72 upon arm 34. Cap 72 may include a further shoulder 74 to likewise secure upon head 76 of a connected device 20. Cap 74 operates as a structure to secure additional objects. In one aspect cap 74 is configured to receive an accessory, such a camera mount 80 equipped with swivel and pan capabilities. A camera may be mounted upon mount 80 for film and photography operation. A variety of accessories may be interchanged upon cap 72 as desired. A variety of devices may also be used in conjuction with camera mount 80.

With reference to FIGS. 16-20, stick attachment device 20 is shown in connection with a weight-assist receiver 100 of a backpack 102 or of a frame of another object. An attachment device 20 attached to a stick 51 and inserted into receiver 100 allows a user to experience a weight relief in supporting a backpack of other object. For instance, the user will insert a pair of sticks 51, 52 into a pair of receivers 100 which are positioned on a frame of the backpack 102. The sticks 51, 52 extend downward to connect the ground and allow the weight of the backpack to be supported, at least in part, thus providing at least some temporary relief to the user without having to remove the backpack. The sticks 51, 52 may be retracted during normal travel and then extended when desired. Sticks 51, 52 may also be detached during normal travel, or connected when concluding travel to operate as a partial stand for the backpack (to self-lean against a tree or other structure, for instance). The sticks 51, 52 also assist the user in removing of the backpack 102 by having the weight at least partially supported during removal of the backpack or frame.

Figure 17:
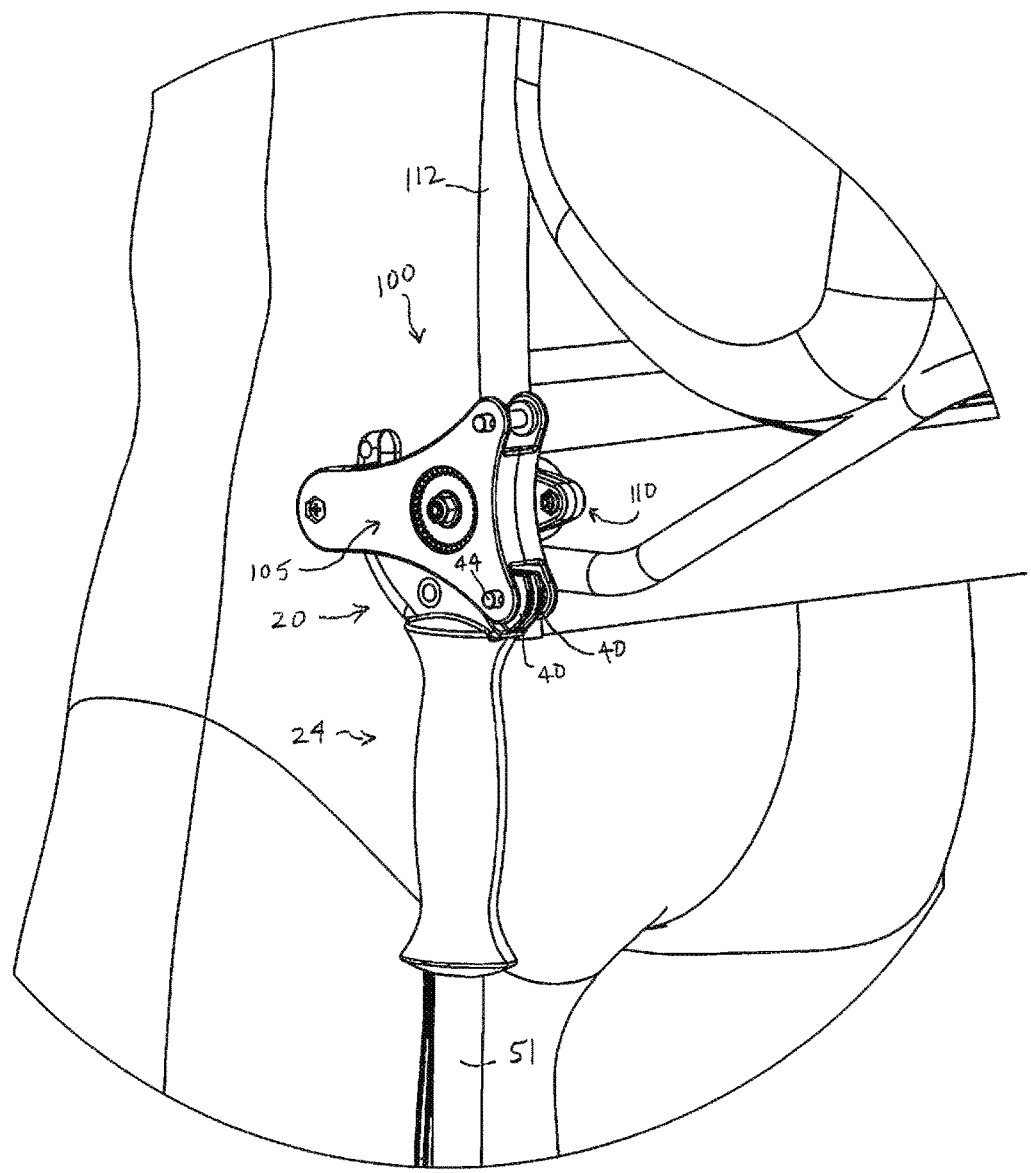
FIG. 17 is a partial enhanced perspective view of a receiver aspect of the present invention and showing connection with the device of FIG. 3.
Figure 18:
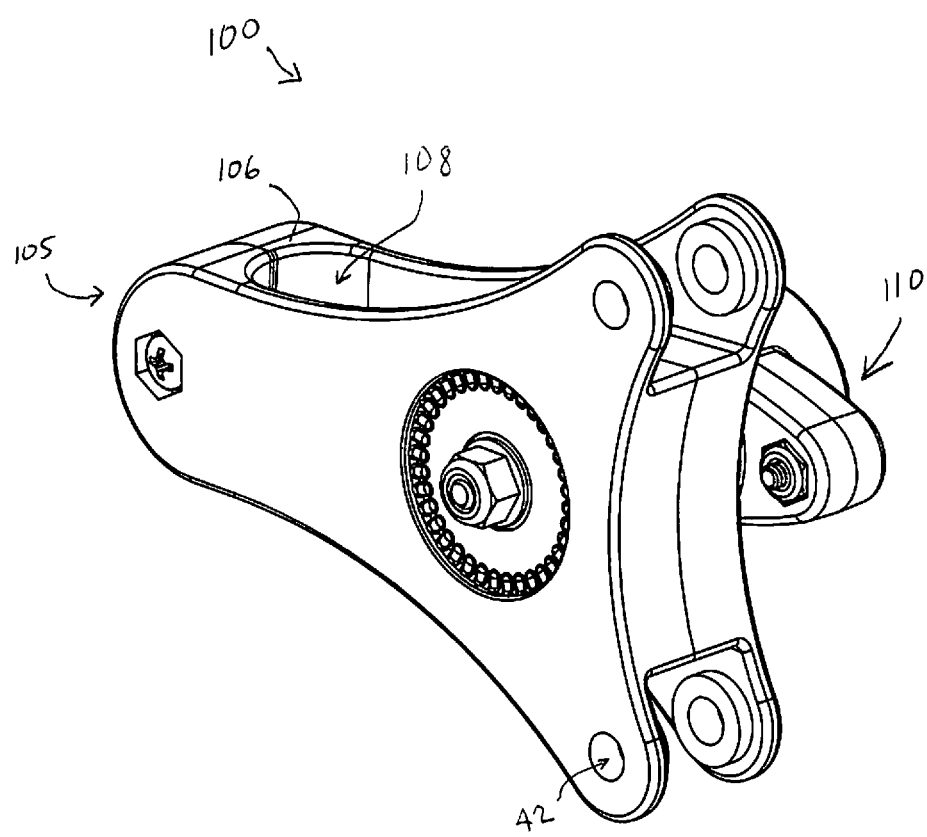
FIG. 18 is a perspective view of the receiver of FIG. 17.
Figure 19:
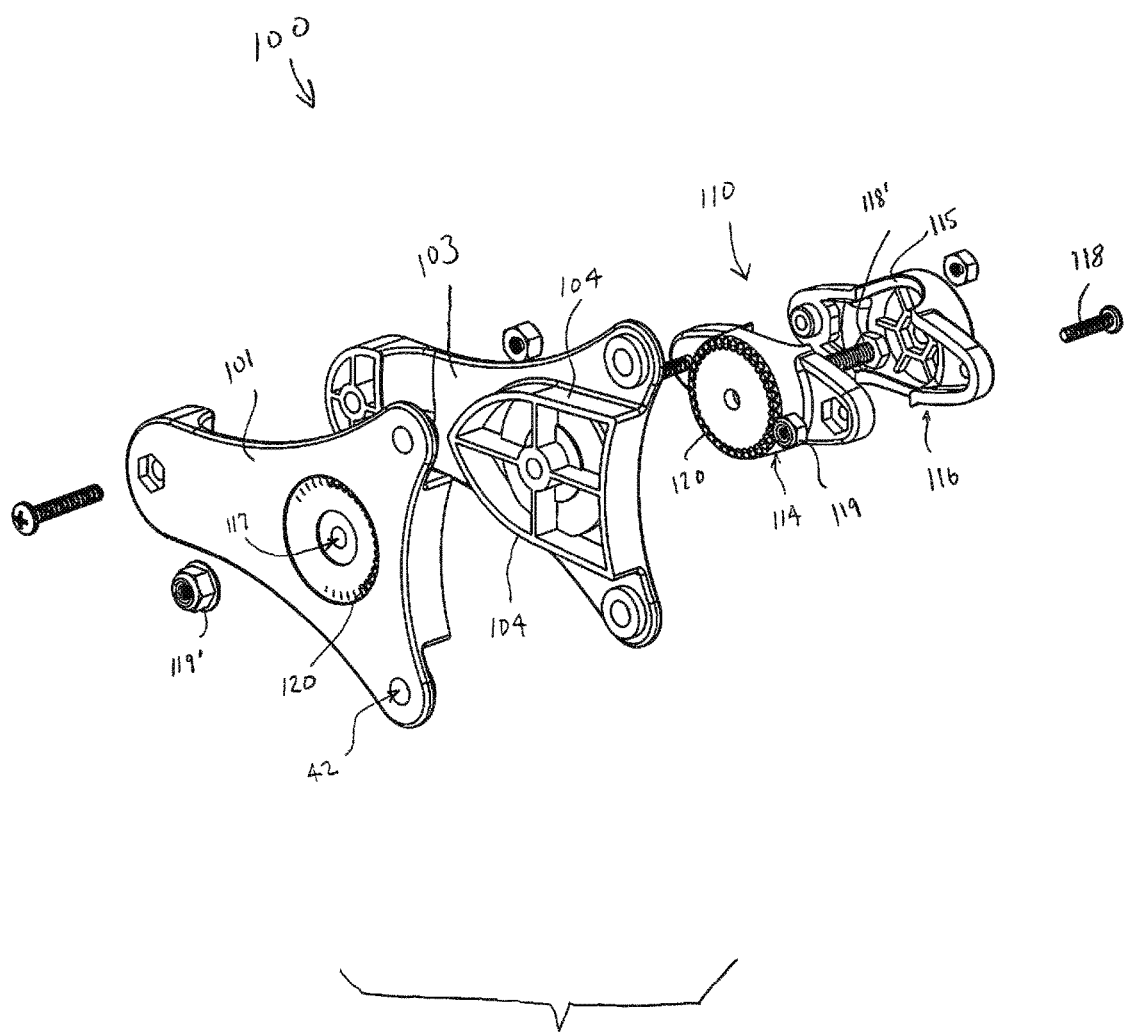
FIG. 19 is an exploded perspective view of the receiver of FIG. 18.
Figure 20:
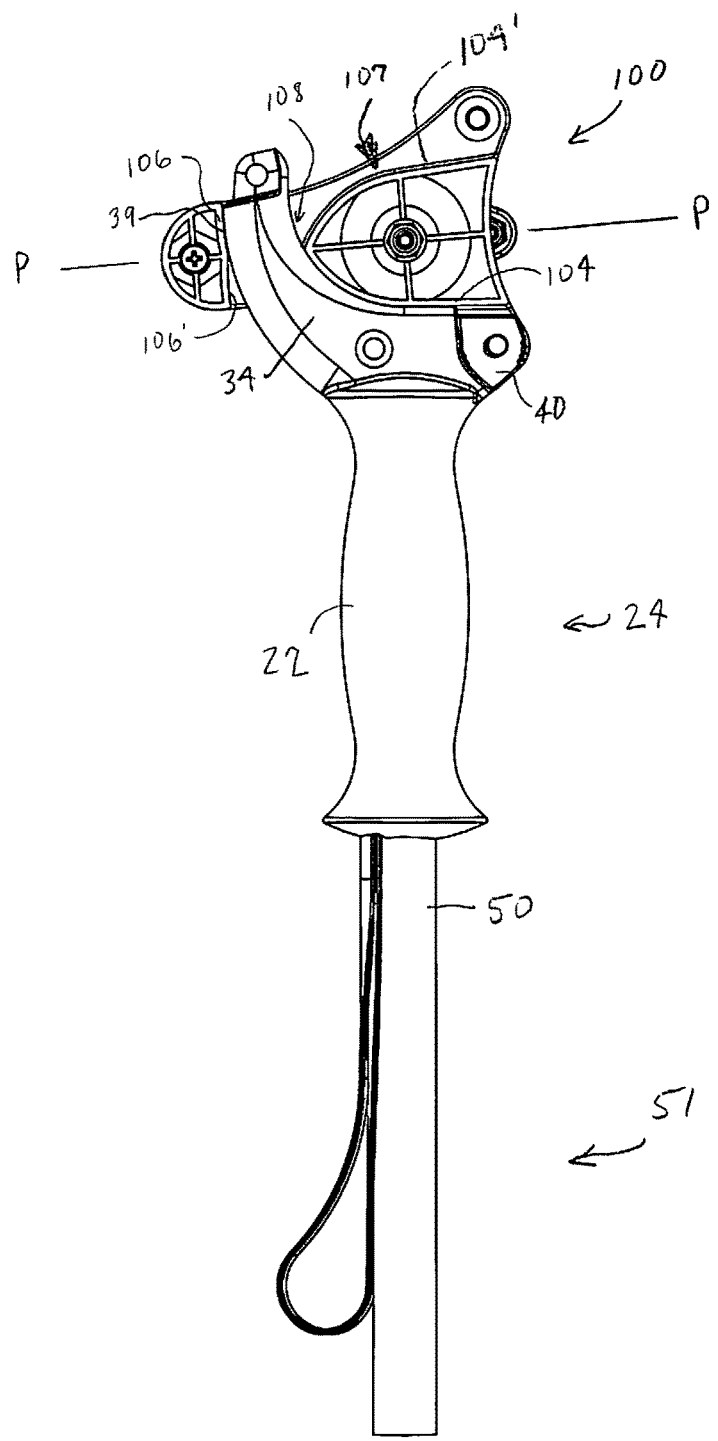
FIG. 20 is a left side view of the receiver of FIG. 17 with a feature removed for clarity.

As shown in FIGS. 17 and 18, receiver 100 includes a housing 105 and a frame mount 110. Housing 105 is configured to receive a stick 51 within a gap 108 defined by the housing 105. The frame mount 110 is configured to mount to a frame element of the object, such as to a backpack frame or to the frame of a backpack or other object. The housing 105 includes a core 107 (See FIG. 20) having a receiver wall 104 (or a pair of receiver walls 104, 104'). The receiver wall is configured to receive the top surface 38 of an arm 34 extending upward from the stick 51. The through hole 42 of device 20 is configured to align with through holes 42 of housing 105 and to receive pin 44 which also passes within through holes 42 of housing 105. Arm 34 is configured to abut against receiver wall 104 and to extend between a gap 108 defined between core 107 (or wall 104) and stop 106. Stop 106 is positioned at a terminal portion of housing 105. In one aspect wall 104 has a surface contoured to match the concave contour of arm 34. Particularly, the wall 104 is constructed to match the contour of top surface 38. In one aspect stop 106 has a surface contoured to match the contour of an outside convex surface 39 (see also FIG. 6, FIG. 20) of arm 34. Arm 34 and receiver 100 are configured such that when arm is inserted into gap 108, both the convex surface 39 and concave contoured surface 38 of arm 34 simultaneously abut the respective concave and convex surfaces of core 107 (or wall 104) and stop 106. When arm 34 is secured within gap 108, pin 44 is inserted into through holes 42 to lock arm 34 and device 20 into receiver 100 as shown in FIG. 20. In such configuration, arm and device 20 are locked and inhibited from movement or rotation from within receiver 100 with a simple insertion of a single quick-release pin 44.

In further aspects, housing 105 is made of a first receiver casing 101 connected to a second receiver casing 103. Each casing 101, 103 includes a portion of core 107 such that when combined the complete core 107 is provides. Fasteners having lock heads and nuts are used to secure the first receiver casing 101 to the second receiver casing 103. Countersunk openings receive the head of fasteners and nuts to provide a smooth user-friendly finish and ease of assembly. Housing 105 is symmetrical about a central plane P-P passing through a center hole 117 as shown in FIG. 20. For instance, wall 104 on one side of core 107 is symmetrical to the wall 104' on the opposite side of core 107, and stop 106 is symmetrical with stop 106'. Such symmetry makes for convenient use and attachment of receiver 100 to either a left side or a right side of an object or frame, there being no requirement to worry about an upside or a downside aspect of the housing 105.

Receiver 100 is firmly secured to a frame 112 of backpack 102 by use of frame mount 110. Frame mount 110 includes cooperating brackets 114, 116 which wrap about frame 112 and secure together with fasteners such as bolts 118, nuts 119, screws or other fasteners. A bolt 118' is also provided through mount 110 and through a hole in frame 112 and secured with nut 119'. In one aspect bolt 118' has a head which is received in a holder defined by bracket 116 for convenient holding of bolt 118' from spinning during threading of bolt 119'. Bolt 118' also passes through a center hole 117 running through receiver 100. Bracket 116 defines a curve 115 configured to receive a portion of frame 112 to accommodate wrap-around of frame mount 110 about frame 112, for instance. Bracket 114 has a similar or corresponding curve to also accommodate placement and firm securing to frame 112.

Bracket 114 includes teeth 120 which mesh with like teeth 120 contained within respective receiver casings 101, 103 of receiver 110. Receiver casings 101, 103 join together with bolts or other fasteners to form housing 105 and in part define gap 108. Bolts, nuts or other fasteners are countersunk into countersink holes formed in receiver 100 and frame mount 110. Housing 105 may be adjusted to secure to frame mount 110 at different angles by rotating receiver casing 103 about bracket 114 so that housing 105 is situated within bracket teeth at a new orientation. Thus, the inserted stick 51 may project from the frame 112 or object at a different angle, which may be easily adjusted by loosening of nut 119' and readjustment of housing 105 about bracket 114.

Receiver 100 is configured for attachment to frame 12 at various locations on backpack 102 (or upon other object) and may be used symmetrically such that either upside or downside is identical so that receiver 100 may be mounted on either a right side or left side or other side of backpack 102. As shown in FIG. 20, arm 34 may alternatively abut against wall 104' and insert into gap 108 from top to bottom, so that the same or similar receiver may be mounted to a fame element on a reverse side of backpack 102. In such alternative mounting, the convex contour of arm 34 would abut against the concave contour of stop 106a for a locking arrangement. Quick release pin 44 accommodates easy and single tool-free connection and detachment of sticks 51, 52 from backpack.

Device 20 allows a user to achieve multiple functions for sticks 51, 52, such as for connection to form a shooting bipod, tripod, or component for weight assist of objects such as backpacks. A further aspect of the invention includes sticks 51, 52 comprising the device 20. Yet further aspects of the invention include a shooting bipod comprising a first stick 51 and a second stick 52 each equipped with the attachment device 20 and a quick release pin 44 positioned through the through holes 42. A further aspect of the invention includes a tripod utilizing the bipod as described where the quick-release pin 44 is connected to a third stick 53. Yet a further aspect of the invention includes the bipod 60 or the tripod 70 including a cap 72 configured to receive an accessory. In one aspect the invention includes device 20 configured to screw into a threaded receiver positioned at a top of a stick which may include insertion into a grip or handle of a stick or pole. Thus, device 20 may be removed from a stick as desired for use on a different stick. Alternatively, device 20 is connected (and alternatively integrally connected) to a grip or a handle which grip or handle in turn is attached (and/or removable) from various sticks.

In one aspect device 20 (including cap 72) and receiver 100 are made using hardened plastic and molded into the desired configuration. A variety of different materials may also be used. In a further example grip 22, base 30, arm 34 and fingers 40 are integrally connected, and in a further aspect are made using a hardened nylon reinforced with fiberglass. A variety of polymers may also be used for the materials used to create device 20 (and cap 72) and receiver 100, including hardened PVC or other plastics. Pin holder 45 may be comprised of an inserted metal piece configured to receive the pin 44 for storage. The inserted metal piece may be molded in place during production. Shaft 50 (and also receiver 100) may be made from a variety of different materials, including metal (such as aluminum or other metal), carbon fibers, wood, plastics, or a variety of alloys and/or combinations. Shaft 50 is of a telescoping or collapsible variety and may include joints which twist and lock shaft segments to a desired position or length for easy adjustment. Camera mount 80 may include a standard camera mount configured to attach and swivel to traditional tri-pod devices. A camera or other device may be connected to mount 80 as desired.

It should be understood, of course, that the foregoing relates to exemplary embodiments of the invention and that modifications may be made without departing from the spirit and scope of the invention as set forth in the following claims.

What is claimed is:

1. A stick attachment device for tool-free quick release connection of a stick to an object, the attachment device comprising:
    a base configured to be positioned atop a stick;
    an arm extending upwardly from the base; and
    a first connecting finger and a second connecting finger each projecting outwardly from the base and defining a through hole configured to receive a quick-release pin such that tool-free insertion or removal of the quick release pin through the through hole quick-connects or quick-releases the first connecting finger and the second connecting finger with the object, the first connecting finger and the second connecting finger defining a slot configured to receive a portion of the object, a grip downwardly projecting from the base and having a bottom surface defining an opening to a cavity configured to receive a shaft of the stick.

2. The attachment device of claim 1 where the base is integrally connected to the grip, the first connecting finger integrally connected to the base, the arm integrally connected to the base.

3. The attachment device of claim 1 where the object is a like attachment device and the slot is configured to receive a finger of the like attachment device.

4. The attachment device of claim 3 configured to engage with a like attachment device which is identical to the stick attachment device.

5. The attachment device of claim 3 where the through hole of the first connecting finger aligns with the through hole of the second connecting finger which aligns with a through hole of the finger of the like attachment device, the through hole of the first connecting finger and of the second connecting finger configured to allow the quick release pin to pass through.

6. The attachment device of claim 3 where the first connecting finger and the second connecting finger project outward from a face of the base, the face including ribs positioned between the slot.

7. The attachment device of claim 1 where the grip is attached to a stick and the attachment device is connected to an identical attachment device of another stick via a quick-release pin, the attached attachment devices forming a shooting bipod.

8. The attachment device of claim 1 where the first connecting finger includes teeth positioned at an outward edge, the teeth configured to mesh with ribs of a like attachment device.

9. The attachment device of claim 1 where the first connecting finger projects outward from a face of the base, the face including ribs configured to mesh with teeth of a like attachment device.

10. The attachment device of claim 1 where the arm curves upward and defines a smooth concave surface configured to receive at least a portion of a camera or firearm.

11. The attachment device of claim 1 where the first connecting finger is configured to alternatively engage within a weight assist receiver, the through hole configured to receive the quick-release pin passing through the receiver.

12. The device of claim 1 where the cavity is a cylindrical cavity configured to receive a cylindrical shaft of the stick.

13. A shooting bipod device configured to quick-convert into walking sticks, the device comprising:
    a first walking stick having a tool-free quick release stick attachment comprising:
        a first arm integrally connected and extending upwardly from a first base; and
        a first connecting finger and a second connecting finger each integrally connected and projecting outwardly from the first base and defining a first through hole configured to receive a quick release ball detent pin therethrough;
    a second walking stick identical to the first walking stick and having a tool-free quick release stick attachment comprising:
        a second arm integrally connected and extending upwardly from a second base; and
        a third connecting finger and a fourth connecting finger each integrally connected and projecting outwardly from the second base and defining a second through hole configured to receive a quick release ball detent pin therethrough; and
    a quick release ball detent pin positioned through the first through hole and the second through hole connecting the first walking stick to the second walking stick, the first arm and the second arm defining a bipod shooting cradle, the ball detent pin and first and second through holes configured for tool-free quick-insertion and quick-release of the ball detent pin such that removal of the ball detent pin allows rapid tool-free separation of the first walking stick from the second walking stick.

14. The device of claim 13 where the quick release pin is connected to a third stick where insertion of the quick release pin transforms the device from a bipod into a tripod.

15. The device of claim 13 where the ball detent pin includes a ball positioned past the first and second through holes when the pin is inserted into the first and second through holes.

16. The device of claim 13 further comprising a cap connected to the first arm and the second arm, the cap configured to receive an accessory.

17. The device of claim 16 where the accessory is configured to swivel atop the cap.

18. The device of claim 16 where the first arm includes a first through hole and the second arm includes a second through hole and the cap includes a third through hole and a fourth through hole, the first through hole aligned with the third through hole and configured to receive a quick release pin, the second through hole aligned with the fourth through hole and configured to receive a quick release pin.

19. The device of claim 13 where the base further includes a pin holder configured to hold a ball detent pin.

20. A stick attachment device for tool-free quick release connection of a stick to another stick having a like attachment to form a shooting bipod and alternatively to connect to a weight-assist receiver of a backpack, the stick attachment device comprising:
   a base configured to attach to a stick or to a handle of a stick;
   an arm integrally connected to and extending upwardly from the base; and
   a first connecting finger integrally connected to and projecting outwardly from the base and configured to engage with a finger of the like attachment of the another stick and to alternatively engage within the weight assist receiver, the first connecting finger defining a through hole configured to receive a quick-release pin whereby tool-free insertion or removal of the quick release pin through the through hole quick-connects or quick-releases the first connecting finger with or from the finger of the like attachment of the another stick and alternatively quick-connects or quick-releases the first connecting finger with or from the weight assist receiver.

21. A stick attachment device for tool-free quick release connection of a stick to an object, the stick attachment device comprising:
   a base configured to be positioned atop a stick;
   an arm extending upwardly from the base; and
   a first connecting finger projecting outwardly from the base and defining a through hole which aligns with a through hole of the object and is configured to receive a quick-release pin therethrough, the arm configured to insert within a gap defined by the object, the arm having a concave top surface configured to abut against a convex surface of the object and having a convex outside surface configured to abut against a concave surface of the object in part defining the gap of the object, whereby insertion of the pin through the through hole while the arm is positioned in the gap locks the stick to the object.

* * * * *